US012667966B2

(12) United States Patent
Ishikawa et al.

(10) Patent No.: US 12,667,966 B2
(45) Date of Patent: Jun. 30, 2026

(54) ROBOT PROGRAMMING ASSISTANCE APPARATUS, ROBOT PROGRAMMING ASSISTANCE PROGRAM, AND ROBOT PROGRAMMING ASSISTANCE METHOD

(71) Applicant: KAWASAKI JUKOGYO KABUSHIKI KAISHA, Kobe (JP)

(72) Inventors: Kazuyuki Ishikawa, Kobe (JP); Ryusuke Nishikawa, Kobe (JP); Takashi Takatori, Kobe (JP); Tomoya Inoue, Kobe (JP); Yoshiki Inaya, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 66 days.

(21) Appl. No.: 18/718,612

(22) PCT Filed: Dec. 6, 2022

(86) PCT No.: PCT/JP2022/044909
§ 371 (c)(1),
(2) Date: Jun. 11, 2024

(87) PCT Pub. No.: WO2023/112772
PCT Pub. Date: Jun. 22, 2023

(65) Prior Publication Data
US 2025/0042026 A1 Feb. 6, 2025

(30) Foreign Application Priority Data
Dec. 13, 2021 (JP) ................................. 2021-201852

(51) Int. Cl.
B25J 9/16 (2006.01)

(52) U.S. Cl.
CPC ........... B25J 9/1661 (2013.01); B25J 9/1653 (2013.01)

(58) Field of Classification Search
CPC .......... B25J 9/1661; B25J 9/1653; B25J 9/16; G05B 19/05; G06F 8/33
See application file for complete search history.

(56) References Cited

FOREIGN PATENT DOCUMENTS

| JP | H03144804 | * | 6/1991 |
| JP | H08-328897 A | | 12/1996 |

OTHER PUBLICATIONS

Birgmajer et al., "A Matrix Approach to an FMS Control Design," IEEE Robotics & Automation Magazine, vol. 11, No. 4, pp. 92-109 (Dec. 1, 2004).
"Concurrency: Race Conditions and Deadlocks—MATLAB & Simulink" Polyspace Products, XP093328067, pp. 1-4 (Apr. 16, 2021).

* cited by examiner

*Primary Examiner* — Dylan M Katz
(74) *Attorney, Agent, or Firm* — Oliff PLC

(57) ABSTRACT
A programming assistance apparatus assists programming with respect to a program that operates two or more devices including at least a robot in parallel. The programming assistance apparatus includes a device extractor, a determiner, and an alerter. The device extractor extracts an identification name of a device to which an operation command is issued per unit of parallel operation based on a description content of the program. The determiner determines whether there is a shared target device, to which operation commands targeting a same device in two or more parallel operations are issued. The alerter outputs an alert when it is determined that there is the shared target device.

6 Claims, 4 Drawing Sheets

Figure 1:
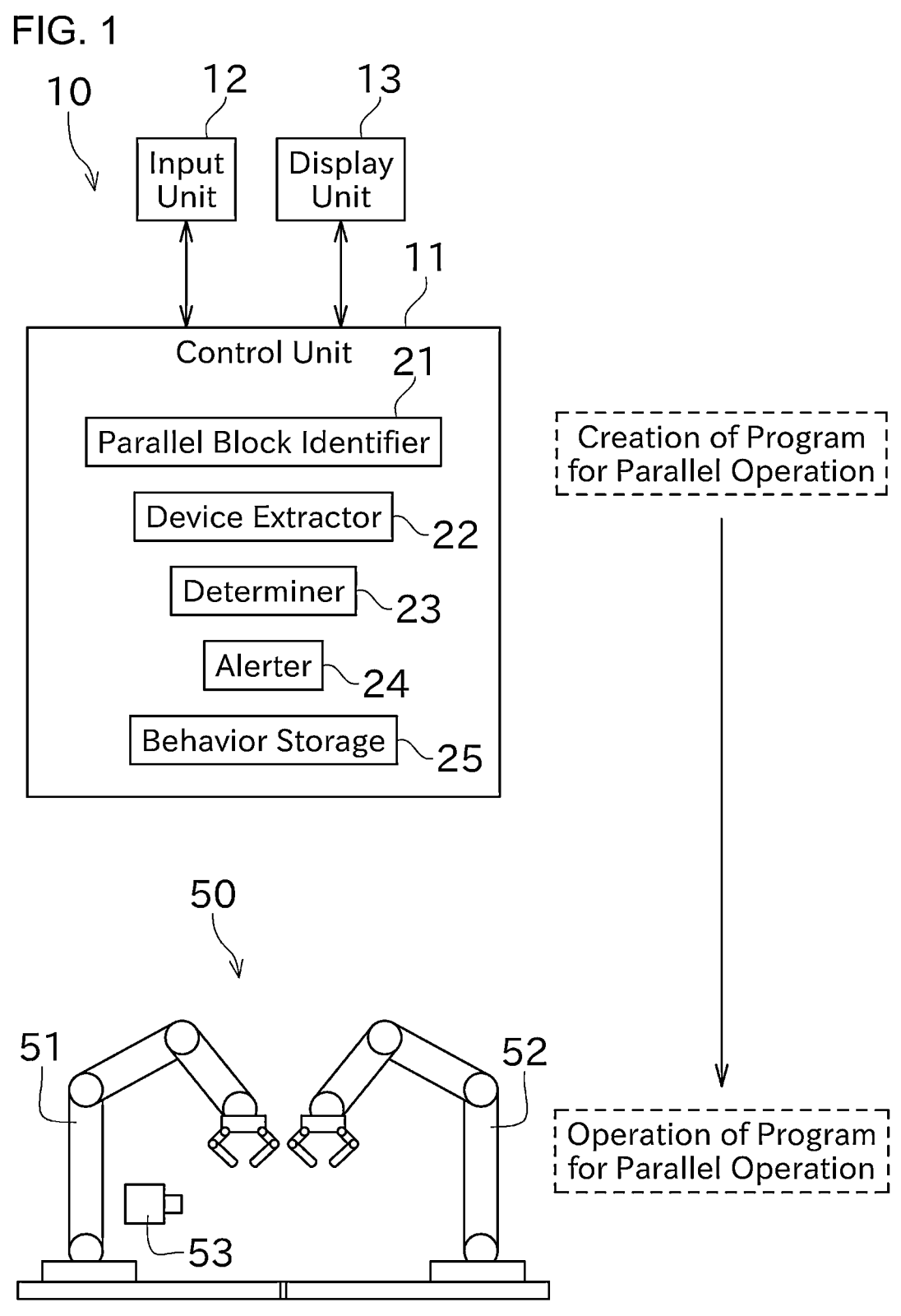

| 12 | 13 |
|---|---|
| Input Unit | Display Unit |

11

Control Unit   21

Parallel Block Identifier

Device Extractor   22

Determiner   23

Alerter   24

Behavior Storage   25

Creation of Program for Parallel Operation

Operation of Program for Parallel Operation

50

51   52

53

```
1     import Arm, Camera
2     arm1 = Arm()
3     arm2 = Arm()
4     camera = Camera()
5
6     arm1.move(posA)
7     if parallel == 0:
8         arm1.move(posB)
9         camera.capture()
10
11    elif parallel == 0:
12        arm1.move(posC)
13        arm2.move(posD)
14    arm2.move(posE)
```

```
1    import Arm, Camera
2    arm1 = Arm()
3    arm2 = Arm()
4    camera = Camera()
5
6    arm1.move(posA)
7    if parallel == 0:
8        arm1.move(posB)
9
10
11   e
12       arm1.move(posC)
13       arm2.move(posD)
14   arm2.move(posE)
```

62

[Alert] This device is a overwrite type.          ×
The last process will possibly be
overwritten.                    [Help] Ignore

61

64     63

What is a overwrite type?          ×
Dismisses the command
being executed and
executes the latest command

A → B

65

ROBOT PROGRAMMING ASSISTANCE APPARATUS, ROBOT PROGRAMMING ASSISTANCE PROGRAM, AND ROBOT PROGRAMMING ASSISTANCE METHOD

TECHNICAL FIELD

The present disclosure relates to programming for controlling devices including a robot so that they operates in parallel.

BACKGROUND ART

Robot, cameras, and other devices are widely used in logistics, delivery, assembly, food, or other fields. For example, in order to reduce cycle time of an operation using a robot, two or more robots are made operate in parallel.

Although it does not target a parallel operation related to a robot, PTL 1 discloses a parallel program operation analysis method. According to PTL 1, the actual operation status of the parallel programs can be visually monitored.

PRIOR-ART DOCUMENTS

Patent Documents

PTL 1: Japanese Patent Application Publication No. H8-328897

SUMMARY OF THE INVENTION

Problems to be Solved by the Invention

In a case where two or more devices (for example, two or more robots) are made operated in parallel, a special program for a parallel operation is created. However, in programming for a parallel operation, a program that has a bug unique to a parallel operation, such as a command to move two or more robots to the same location at the same time may be created. Unlike a simple bug, such as a syntax error in a program, this bug is often not found until the program is installed on each robot and executed. Therefore, it has taken a lot of time and man-hours to find and correct a bug in a parallel operation.

PTL 1 states that by adding message identification data to each of messages that are sent and received between programs that comprise a parallel program, a bug in the program can be efficiently identified. However, there is a need for a mechanism that allows a programmer to more quickly find a portion that highly likely has a bug and to more agilely fix it when creating a program that allows parallel operations of two or more devices.

The present disclosure is made in view of the situation described above and its purpose is to effectively prevent a bug in a program related to parallel operations of two or more devices.

Means for Solving the Problems

The problem to be solved by the present disclosure is as described above. The means to solve this problem and the effects thereof will be described below.

A first aspect of the present disclosure provides a robot programming assistance apparatus with a configuration as described below. That is, this robot programming assistance apparatus assists programming with respect to a program that operates two or more devices including at least a robot in parallel. The robot programming assistance apparatus includes a device extractor, a determiner, and an alerter. The device extractor extracts an identification name of a device to which an operation command is issued per unit of parallel operation based on a description content of the program. The determiner determines whether there is a shared target device. The shared target device is a device to which operation commands targeting a same device in two or more parallel operations are issued. The alerter outputs an alert when it is determined that there is the shared target device.

A second aspect of the present disclosure provides a robot programming assistance program with a configuration as described below. That is, this programming assistance program assists programming with respect to a program that operates two or more devices including at least a robot in parallel. This robot programming assistance program includes following steps. That is, in a first step, an identification name of a device to which an operation command is issued is extracted per unit of parallel operation based on a description content of the program. In a second step, whether there is the shared target device is determined. In a third step, an alert is outputted when it is determined that there is the shared target device.

A third aspect of the present disclosure provides a robot programming assistance method with a configuration as described below. That is, this programming assistance method assists programming with respect to a program that operates two or more devices including at least a robot in parallel. In this robot programming assistance method, an identification name of a device to which an operation command is issued is extracted per unit of parallel operation based on a description content of the program. Whether there is the shared target device is determined. An alert is outputted when it is determined that there is the shared target device.

Accordingly, a user can easily notice a bug that causes an unacceptable conflict of operation commands at a stage of programming based on the alert. As a result, a program related to a parallel operation can be created efficiently.

Effects of the Invention

According to the present disclosure, a bug in a program related to parallel operations of two or more devices can be efficiently prevented.

BRIEF DESCRIPTION OF THE DRAWINGS

FIG. 1 is a schematic diagram illustrating a parallel programming apparatus according to one embodiment of the present disclosure and a parallel operation system that is a target of programming.

EMBODIMENT FOR CARRYING OUT THE INVENTION

Figures 2, 3:
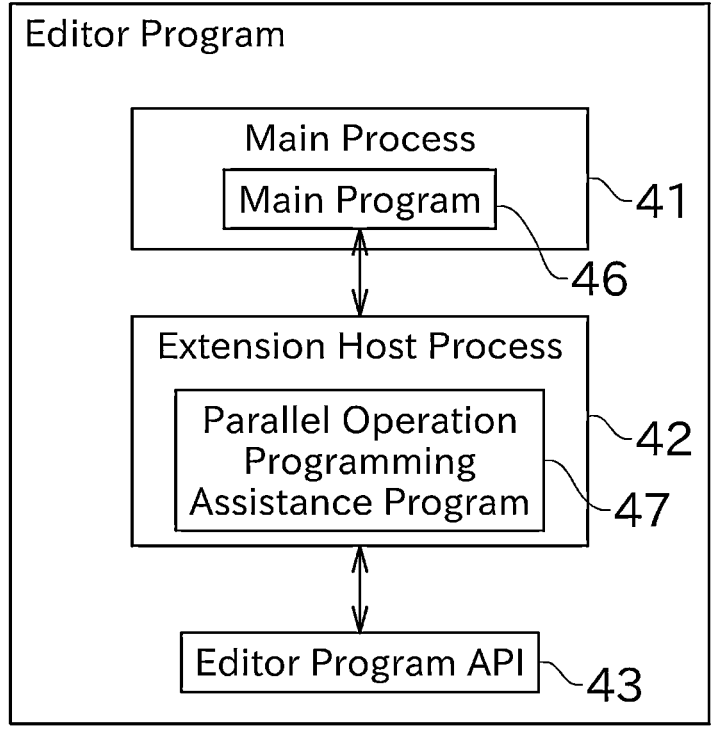
FIG. 2 is a diagram showing an example of a program for a parallel operation.
FIG. 3 is an architecture diagram of an editor program.

The disclosed embodiments will be described below with reference to the drawings. FIG. 1 is a schematic diagram illustrating a parallel programming apparatus 10 according to one embodiment of the present disclosure and a parallel operation system 50 that is a target of programming. FIG. 2 is a diagram showing an example of a program for a parallel operation. FIG. 3 is an architecture diagram of an editor program.

As shown in FIG. 1, the parallel programming apparatus 10 as a robot programming assistance apparatus includes a control unit 11, an input unit 12, and a display unit 13. The parallel programming apparatus 10 is achieved, for example, with a desktop or laptop personal computer.

The control unit 11 is a main body of the computer and includes a CPU, a RAM, a mass storage, or the like. The configuration of the control unit 11 will be described in detail later. The input unit 12 is comprised of, for example, a mouse, a keyboard, or the like. The display unit 13 can graphically display various information, such as an editor screen which will be described below.

An editor program for creating programs is installed on the parallel programming apparatus 10. The editor program is a window application with GUI. GUI stands for Graphical User Interface. When the editor program is started, an editor window is displayed on the display unit 13. With this state, a user operates the input unit 12 to create or edit the program for the parallel operation. As the editor program, for example, a known program called an integrated development environment (IDE) can be used.

The user can create the program for the parallel operation by operating the parallel programming apparatus 10. This program for the parallel operation is used to make the parallel operation system 50 shown in FIG. 1 operate. This parallel operation system 50 includes a first arm-type robot 51, a second arm-type robot 52, and a camera 53.

The program for the parallel operation can be written using any known programming language. Although Python is used in the present embodiment, the language is not limited to this.

The program for the parallel operation includes a parallel operation block. FIG. 2 shows a simple example of the program for the parallel operation that is displayed on the editor window. The example of the program shown in FIG. 2 includes the parallel operation block. The parallel operation block corresponds to lines 7 through 13 of the program. Hereafter, a unit of parallel execution may be referred to as a thread.

When the program in FIG. 2 is executed, a motion command to move to a position A is issued to the first arm-type robot 51 in line 6. After the moving operation of the first arm-type robot 51 to the position A is completed, the two threads in the parallel operation block are started substantially simultaneously.

The parallel operation block includes processes for the two threads.

The operations in the first thread is defined in the indented block, lines 8 and 9, right after the if statement on line 7. As indicated by the condition in the if statement, the thread index number of the first thread is 0. In the first thread, a motion command to move to a position B is issued to the first arm-type robot 51 in line 8. After the moving operation of the first arm-type robot 51 to the position B is completed, a shooting command is issued to the camera 53 in line 9. When the operation of the camera 53 executing the shooting command is completed, the processes in the first thread is completed.

The operations in the second thread is defined in the indented block, lines 12 and 13, right after the elif statement on line 11. As indicated by the condition in the elif statement, the thread index number of the second thread is 1. In the second thread, a motion command to move to a position C is issued to the first arm-type robot 51 in line 12. After the moving operation of the first arm-type robot 51 to the position C is completed, a motion command to move to a position D is issued to the second arm-type robot 52 in line 13. When the moving operation of the second arm-type robot 52 to the position D is completed, the processes in the second thread is completed.

The processes of the parallel operation block are completed when both of the two thread is completed.

When the processes in the parallel operation block are completed, a motion command to a position E is issued to the second arm-type robot 52 in line 14. When the moving operation of the second arm-type robot 52 to the position E is completed, all processes of the program are completed.

The user creates a program, for example, as shown in FIG. 2, using the parallel programming apparatus 10 on which the editor program is installed.

The editor program includes a feature called an extension. By using the extension, the user of the editor program can add a special function that the editor program does not include originally. The user commends the editor program to install the extension and specifies a package file. The package file is a file that obtained by combining two or more files for adding a function to the editor program. Accordingly, an extension function included in the package can be applied to the editor program. Hereafter, this package may be referred to as a function adding package.

The function adding package includes a program file written by a known programming language. As the programming language for this program file, for example, TypeScript, JavaScript, or another known language may be used. However, the programming language for this program file is not limited to these languages.

In the present embodiment, a parallel operation programming assistance package is applied to the editor program. The parallel operation programming assistance package is a kind of the function adding packages described above. As described in detail below, this assistance package includes a function to point out a portion of the program the user is editing on the editor that likely has a bug. Such a function is sometimes called a linter function. The parallel operation programming assistance package is created by, for example, the manufacturer of the first arm-type robot 51 and the second arm-type robot 52. The user can obtain the package file, for example, by downloading it on a website.

FIG. 3 is an example of the architecture diagram of the editor program. When the editor program is executed on the parallel programming apparatus 10, a main process 41 and an extension host process 42 are started on the parallel programming apparatus 10.

In the main process 41, a main program 46 is executed. The main program 46 provides basic functions of the editor program related to, for example, creation, load, or save of a program file. The main program 46 also provides functions related to edit of a program file, such as functions to move an edit position (a caret), insert a string to the edit position, select a string, and delete a string.

The extension host process 42 is a process for realizing the extension. When the above-mentioned function adding package is installed on the editor program, an assistance program 47 for robot programming included in the package is executed in the extension host process 42. Hereafter, this program may be referred to simply as the assistance program.

In this assistance program 47, processes to realize a parallel block identifier 21, a device extractor 22, a determiner 23, an alerter 24, and a behavior storage 25 shown in FIG. 1 are written.

The parallel block identifier 21 identifies a portion where the above-mentioned parallel operation block is written based on the description content of the program being edited on the editor program.

The device extractor 22 extracts a device to which an operation command is issued per thread based on the description content of the parallel operation block identified by the parallel block identifier 21.

The determiner 23 determines whether operation commands from two or more threads are issued to the same device. Hereafter, in such a case where operation commands targeting the same device are issued in parallel, the device in question may be referred to as the shared target device. The above-mentioned determination can be rephrased as a determination on whether there is the shared target device. The determination by the determiner 23 is performed based on the result of the extraction by the device extractor 22.

The alerter 24 alerts the user by the display on the editor program when there is the shared target device.

The behavior storage 25 stores data on what kind of behavior the device exhibits when operation commands are issued to the same device in parallel per type of devices. This data is used for the alert by the alerter 24.

An editor program API 43 shown in FIG. 3 is an API published by the editor program. API stands for Application Programming Interface. A program for the extension can use some of functions that the editor program includes via API.

Figure 4:
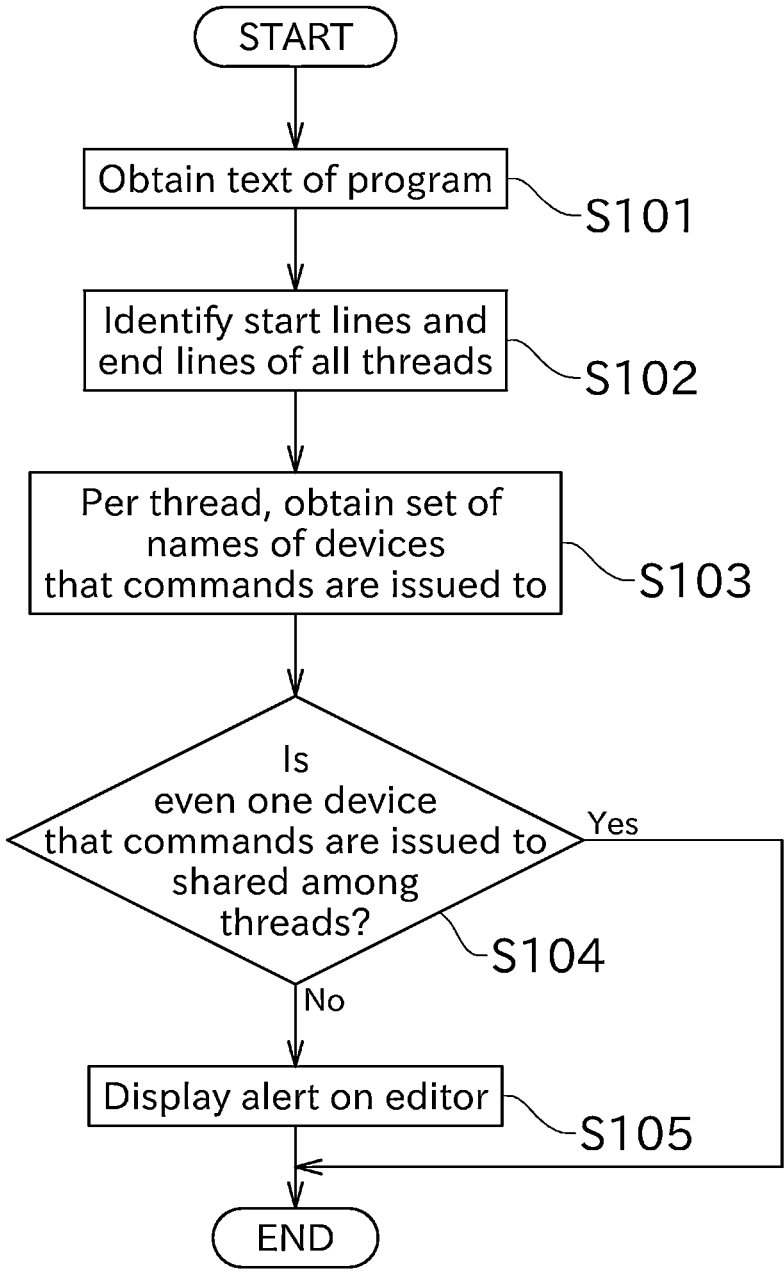
FIG. 4 is a flowchart illustrating processes performed in a robot programming assistance program.

Processes in the assistance program 47 installed as the function adding package will be described below with reference to the flowchart shown in FIG. 4. The flow shown in FIG. 4 is executed each time the content of the program is changed on the editor window.

When the processes are started, as shown in step S101, the content of the program (in other words, the text data) that is currently entered in the editor program is obtained. In this manner, for example, the text data that corresponds to the program shown in FIG. 2 can be obtained. The acquisition of the text data can be achieved by the assistance program 47 calling the editor program API 43.

Next, as shown in step S102, the above text data is appropriately analyzed. Based on this analysis, the location of the parallel operation block included in the program is identified. In the analysis in step S102, the start lines and the end lines of all threads are further identified. With respect to the example shown in FIG. 2, that a number of the threads that are executed in parallel is 2, that the thread with the index number 0 (the first thread) is from line 8 to line 9, and that the thread with the index number 1 (the second thread) is from line 12 to line 13 are identified by the process in step S102. This process can be achieved using an appropriate text processing technology, such as regular expression.

Next, as shown in step S103, with respect to each of all the threads, each line in the thread from the start line to the end line is examined, the names of the devices to which the operation commands are issued in the thread are extracted, and they are obtained as a set without duplication. For example, from the description "arm1.move (posB)" on line 8, "arm1" is extracted as the name of the device. This extraction process can be achieved, for example, by extracting a string that matches an appropriate regular expression from each line.

As the result of this process, with respect to the first thread, {arm1, camera} is obtained as a set of devices by the examination on lines 8 and 9 in FIG. 2 and, with respect to the second thread, {arm1, arm2} is obtained as a set of devices by the examination on lines 12 and 13 in FIG. 2. In the program, the set can be represented by an array variable, for example.

Next, as shown in step S104, whether the devices included in the above set obtained for each thread are included in the other sets obtained for the other threads is determined. This determination can easily be made by examining for elements commonly included in two array variables. In the above example, arm1 included in the set obtained for the first thread is also included in the set obtained for the second thread.

In step S104, whether there is duplicated devices can also be determined based on whether the sum of the number of the devices included in the set obtained for each thread and the number of devices included in the sum-set of devices for all the threads are identical. In the above example, the sum of the number of the devices included in the set for each thread is 2+2=4. On the other hand, the sum-set for all the threads is {arm1, arm2, camera} and the number of the devices included is 3. Since they do not match, it is determined that one or more devices to which the commands are issued are duplicated among two or more threads.

When it is determined that even one device to which the operation commands are issued is duplicated among the threads as a result of the determination in step S104, it means that the operation commands are issued in parallel to the same device from two or more threads. If such a shared target devices exists, there is a high possibility that two or more operation commands conflict with each other, so an alert is displayed on the editor window as shown in step S105.

The alert can be achieved, for example, by emphasizing the line that indicates the process of issuing the operation command to the shared target device (in this case, arm1) on the editor window displayed on the display unit 13 in an appropriate manner. A specific example of the alert is shown by an emphasized portion 61 in FIG. 5. In the example shown in FIG. 5, the emphasis is achieved by underlining with a dashed line. However, any means for the emphasis may be employed as desired. For example, the emphasis may be achieved by changing the color of the text different from the others or by displaying an alerting mark on the left side of the line. The decoration on the text for the emphasis can be made by the assistance program 47 calling the editor program API 43.

If there is no shared target device, the process in step S105 is skipped.

Figure 5:
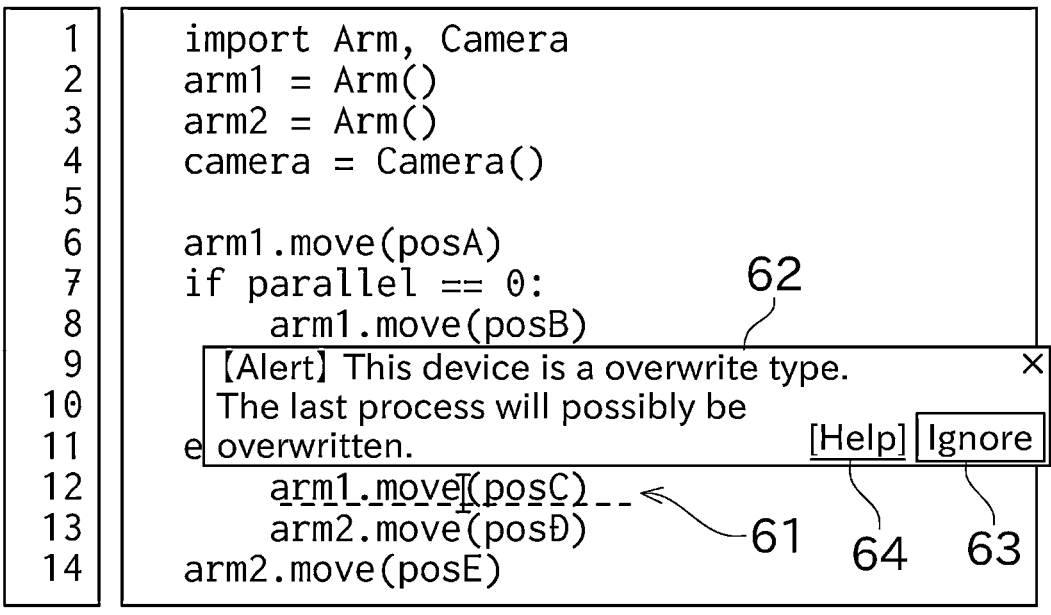
FIG. 5 is a schematic diagram showing an alert raised in an editor program.
Figure 5:
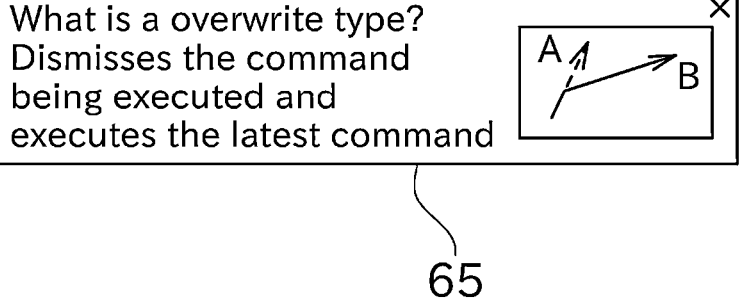

In the present embodiment, in the case where the alerting display is performed in step S105, when the user moves a mouse cursor over the emphasized portion 61 by operating the input unit 12, a pop-up window 62 is displayed at a position near the emphasized portion 61 as shown in FIG. 5. On the pop-up window 62, for example, a simple sentence explaining the content of the alert is displayed. In such a manner, the alert can also be achieved by displaying a message.

The above-mentioned alert allows the user to notice early, for example, that the portion "arm1" in line 12 in the program shown in FIG. 2 is possibly a bug that causes an unexpected event during the parallel operation.

As shown in FIG. 5, a button 63 related to ignoring the alert is displayed on the pop-up window 62. When this button 63 is clicked, the emphasis is deactivated, the pop-up window is closed, and, after that, the alert of the conflicts between the commands regarding this portion will no longer be displayed.

The actual behavior of the device when two or more operation commands conflict with each other with respect to the same device will now be described below.

In the following description, a case where the device is a robot (for example, the first arm-type robot 51) will be described. For example, consider the case where a thread issues a motion command to move to a spot A to the robot that is located at a spot P and, after that, another thread issues a motion command to move to a spot B to the same robot before the robot completes the movement based on the previous command. The behavior of the robot in this case can generally be classified into the following three types.

The robot that exhibits a behavior of a first type does not start the movement to the spot B until it reaches the spot A even when the motion command to move to the spot B is issued. After the robot completes the movement to the spot A, it starts to move the spot B following the motion command to move to the spot B. In such a way, the two or more operation commands that conflict with each other are executed sequentially in the order of acceptance. Hereafter, the device that exhibits such a behavior may be referred to as a sequential execution type.

The robot that exhibits a behavior of a second type changes its destination from the spot A to the spot B when the motion command to move to the spot B is issued during the process of moving to the spot A and it immediately starts moving to the spot B. In other words, the motion command to move to the spot A is discarded in the middle of the execution. Hereafter, the device that exhibits such a behavior may be referred to as an overwrite type.

The robot that exhibits a behavior of a third type immediately stops with an error when the motion command to move to the spot B is issued during the process of moving to the spot A. However, it may also stop with an error after completing the movement to the spot A. Hereafter, the device that exhibits such a behavior may be referred to as an error type.

As shown in FIG. 5, the message displayed in the above-mentioned pop-up window 62 includes a description related to which type of behavior that the robot exhibits. FIG. 5 shows an example of the message in the pop-up window 62 displayed in the case where the robot "arm1" is an overwrite type.

In the pop-up window 62, a link 64 is also displayed. When the user clicks the link 64 by operating the input unit 12, a help window 65 is separately displayed. The format of display of the link 64 may be determined as desired. For example, it may be displayed as a button. Accordingly, the user can understand the behavior of the device when the commands conflict with each other well with the description on the help window 65 and they can appropriately determine, for example, whether the alert can be ignored.

Next, a case where the device is a camera will be described. For example, consider the case where, while the camera is performing a shooting operation following a first shooting command issued by a thread, a second shooting command is issued from another thread. The behavior of the camera in this case can generally be classified into the following three types.

The camera that exhibits a behavior or a first type does not start the second shooting until it completes the shooting based on the first shooting command even when 5 the second shooting command is issued. The camera immediately starts shooting following the second shooting command when the first shooting is completed. The camera with this type of the behavior can be referred to as the above-mentioned sequential execution type.

The camera that exhibits a behavior of a second type does not stop shooting based on the first shooting command even when the second shooting command is issued. The second shooting command is accepted immediately after the first shooting is completed, but the second shooting will not be performed. The result of shooting in response to the second shooting command will be the same as the result of shooting in response to the first shooting command. Hereafter, the device that exhibits such a behavior may be referred to as a confluence type.

The camera that exhibits a behavior of a third type immediately stops with an error when the second shooting command is issued during the process of shooting based on the first shooting command. The camera with this type of the behavior can be referred to as the above-mentioned error type.

In the present embodiment, the manufacturer of each device, for example, that of the robot, preliminarily prepares data required for the control of the robot in a form of a module file and provides it to the user. A module file is a program that is created with the premise of being used by another program.

Although a drawing is omitted, this module file includes a definition of a class. A class means an aggregation of variables and functions necessary to represent something (in this case, each device). The "Arm" module file includes, for example, the definition of the "Arm" class, which is a class related to the arm-type robot. The "Camera" module file includes the definition of the "Camera" class, which is a class related to the camera. A definition of a class includes definitions of functions and specifications of parameters required for the functions. A function defined in a class is called a method. For example, the definition of the "Arm" class includes the content of the "move" method that means issuance of a motion command.

The definition of the class in the module file further includes data on which type of the behavior the robot exhibits when commands conflict with each other.

The provided module file is loaded by the import statement in the first line of the program shown in FIG. 2. In the processes from line 2 to line 4 of the program, the necessary number of instantiations (two for the Arm class and one for the Camera class) are performed based on the classes. The class is sometimes compared to a blueprint. The instantiation means to generate actual data on the memory of the computer based on the class. At the time of instantiation, an object name (an identification name), such as "arm1", is given to each of instances (also called objects). As shown in line 6 and line 9 of the program in FIG. 2, by executing the method for the object, the corresponding operation command is issued to the device.

The name of the device to which the command is issued as explained in the above description of step S103 substantially means the name of the object for which the method is executed.

The assistance program 47 refers to the class definition of the object and obtains the data on which type of the behavior the device related to the alert exhibits when the commands conflict each other. Based on the data obtained as above, the assistance program 47 can display the type of the behavior on the pop-up window 62 in FIG. 4. Accordingly, the useful information can be presented to the user.

As described above, the flow shown in FIG. 4 is executed each time an editing operation is performed on the editor window. Therefore, if "arm1" in line 12 in FIG. 2 is changed into "arm2" on the editor, the emphasized portion 61 will immediately disappear. Furthermore, if "arm2" is changed back to "arm1" on the editor, the emphasized portion 61 will appear again as shown in FIG. 5. The time from an editing operation is performed on the editor window until an alert appears or disappears is sufficiently short, for example, equal to or shorter than one second. Therefore, since the real-time nature of the display of the alert is substantially ensured, the user can notice a possible bug in the program very early.

As described above, the parallel programming apparatus 10 of the present embodiment assists programming with respect to the program that operates more the one devices including the first arm-type robot 51 and the second arm-type robot 52 in parallel. The parallel programming apparatus 10 includes the device extractor 22, the determiner 23, and the alerter 24. The device extractor 22 extracts the object name of the device to which the operation command is issued per unit of parallel operation based on the description content of the program. The determiner 23 determines whether there is the shared target device. The shared target device is a device to which the operation commands targeting the same device in two or more parallel operations are issued. The alerter 24 outputs an alert when it is determined that there is the shared target device.

Accordingly, the user can easily notice a bug that cases an unacceptable conflict of the operation commands at a stage of programming based on the alert. As a result, the program related to the parallel operation can be created efficiently.

The parallel programming apparatus 10 of the present embodiment includes the parallel block identifier 21 that identifies the parallel operation block in the program in which the parallel operations of the device are written based on the description content of the program. The device extractor 22 extracts the object name of the device to which the operation command is issued from the parallel operation description portion per unit of parallel operation.

Accordingly, an appropriate alert can be made with respect to the portion of the program that performs the parallel operation.

The parallel programming apparatus 10 of the present embodiment includes the behavior storage 25 that stores data on the behavior of the device when the two or more operation commands targeting the same device are issued to the device in parallel per class. The pop-up window 62 output by the alerter 24 for alerting includes information about the behavior of the device when the two or more operation commands are issued in parallel.

Accordingly, the user can easily understand the behavior of the device when the operation commands conflict with each other and deal with the alert.

In the parallel programming apparatus 10 of the present embodiment, the alert by the alerter 24 includes emphasizing the portion of the program that specifies the shared target device (in the example shown in FIG. 5, arm1).

Accordingly, the user can easily focus on the portion that highly likely has a bug.

In the parallel programming apparatus 10 of the present embodiment, the alerter 24 makes the alert in substantially real time in response to a change in the description content of the program.

Accordingly, the user can notice the possibility of the bug earlier.

While the preferred embodiment of the present disclosure has been described above, the configurations explained above may be modified, for example, as follows.

Such a modification may be made singularly or made in combination with any other modification.

The alert message may be displayed, for example, on another pane of the editor window instead of on the pop-up window 62.

The type and number of the devices that comprises the parallel operation system 50 can be determined as desired. The form of the robot for which the parallel operations are programmed may be any form, for example, an arm form, a hand form, or a cart form. Another sensor, such as a laser scanner, may be included as a target for which the parallel operations are programmed instead of or in addition to the camera.

The behavior of the device when the operation commands conflict each other may be written per object instead of written in the class definition. In other words, the behavior of the device when the operation commands conflict each other may be written per individual device instead of written per type of the devices.

The function of detecting the shared target device and alerting may be provided by the main program 46 instead of by the assistance program 47.

The content of the alert message may be determined as desired. For example, the alert message may be "This process conflicts with another process and may cause an unintended behavior when executed". An indication that identifies the line that conflicts with the emphasized line (for example, an indication of the line number) may be included in the message.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

From the above disclosure, at least following technical ides can be grasped.

(Item 1) A robot programming assistance apparatus, which is an assistance apparatus that assists programming with respect to a program that operates two or more devices including at least a robot in parallel, comprising:

a device extractor that extracts an identification name of a device to which an operation command is issued per unit of parallel operation based on a description content of the program;

a determiner that determines whether there is a shared target device, which is a device to which operation commands targeting a same device in two or more parallel operations are issued; and an alerter that outputs an alert when it is determined that there is the shared target device.

(Item 2) The robot programming assistance apparatus according to Item 1, comprising:

an identifier that identifies a parallel operation description portion of the program in which a parallel operation of a device is written based on the description content of the program, wherein the device extractor extracts an identification name of a device to which an operation command is issued from the parallel operation description portion per unit of parallel operation.

(Item 3) The robot programming assistance apparatus according to Item 1 or 2, comprising:

a behavior storage that stores data on a behavior of a device when two or more operation commands targeting a same device are issued to the device in parallel per device or per type of devices, wherein the alert outputted by the alerter includes information about the behavior of the device when two or more operation commands are issued in parallel.

(Item 4) The robot programming assistance apparatus according to any one of Item 1 to 3, wherein the alert outputted by the alerter includes emphasizing a portion of the program that specifies the shared target device.

(Item 5) The robot programming assistance apparatus according to any one of Item 1 to 4, wherein the alerter makes the alert in substantially real time in response to a change in the description content of the program.

(Item 6) A robot programming assistance program, which is a programming assistance program that assists programming with respect to a program that operates two or more devices including at least a robot in parallel, comprising:

a step wherein an identification of a device to which an operation command is issued is extracted per unit of parallel operation based on a description content of the program;

a step wherein whether there is a shared target device, to which is a device to which operation commands targeting a same device in two or more parallel operations are issued, is determined; and a step wherein an alert is outputted when it is determined that there is the shared target device.

(Item 7) A robot programming assistance method, which is a programming assistance method that assists programming with respect to a program that operates two or more devices including at least a robot in parallel, comprising:

extracting an identification of a device to which an operation command is issued per unit of parallel operation based on a description content of the program;

determining whether there is a shared target device, to which operation commands targeting a same device in two or more parallel operations are issued; and outputting an alert when it is determined that there is the shared target device.

The invention claimed is:

1. A robot programming assistance apparatus, which is an assistance apparatus that assists programming with respect to a program that operates two or more devices including at least a robot in parallel, comprising:

a processor programmed to:

extract an identification name of a device to which an operation command is issued per unit of parallel operation based on a description content of the program;

determine whether there is a shared target device, which is a device to which operation commands targeting a same device in two or more parallel operations are issued; and output an alert when it is determined that there is the shared target device, and a behavior storage that stores data on a behavior of a device when two or more operation commands targeting a same device are issued to the device in parallel per device or per type of devices, wherein the alert includes information about the behavior of the device when two or more operation commands are issued in parallel.

2. A robot programming assistance apparatus, which is an assistance apparatus that assists programming with respect to a program that operates two or more devices including at least a robot in parallel, comprising:

a processor programmed to:

extract an identification name of a device to which an operation command is issued per unit of parallel operation based on a description content of the program;

determine whether there is a shared target device, which is a device to which operation commands targeting a same device in two or more parallel operations are issued; and output an alert when it is determined that there is the shared target device, wherein by the alert includes emphasizing a portion of the program that specifies the shared target device.

3. A robot programming assistance apparatus, which is an assistance apparatus that assists programming with respect to a program that operates two or more devices including at least a robot in parallel, comprising:

a processor programmed to:

extract an identification name of a device to which an operation command is issued per unit of parallel operation based on a description content of the program;

determine whether there is a shared target device, which is a device to which operation commands targeting a same device in two or more parallel operations are issued; and output an alert when it is determined that there is the shared target device, wherein the alert is substantially in real time in response to a change in the description content of the program.

4. The robot programming assistance apparatus according to claim 1, wherein:

wherein the processor is programmed to identify a parallel operation description portion of the program in which a parallel operation of a device is written based on the description content of the program, and the processor extracts an identification name of a device to which an operation command is issued from the parallel operation description portion per unit of parallel operation.

5. The robot programming assistance apparatus according to claim 2, comprising:

wherein the processor is programmed to identify a parallel operation description portion of the program in which a parallel operation of a device is written based on the description content of the program, and the processor extracts an identification name of a device to which an operation command is issued from the parallel operation description portion per unit of parallel operation.

6. The robot programming assistance apparatus according to claim 3, comprising:

wherein the processor is programmed to identify a parallel operation description portion of the program in which a parallel operation of a device is written based on the description content of the program, and the processor extracts an identification name of a device to which an operation command is issued from the parallel operation description portion per unit of parallel operation.

*   *   *   *   *